Jan. 15, 1952   K. E. STOBER   2,582,294
CONTINUOUS METHOD FOR COOLING AND SHAPING THERMOPLASTICS
Filed Oct. 31, 1947   4 Sheets-Sheet 2

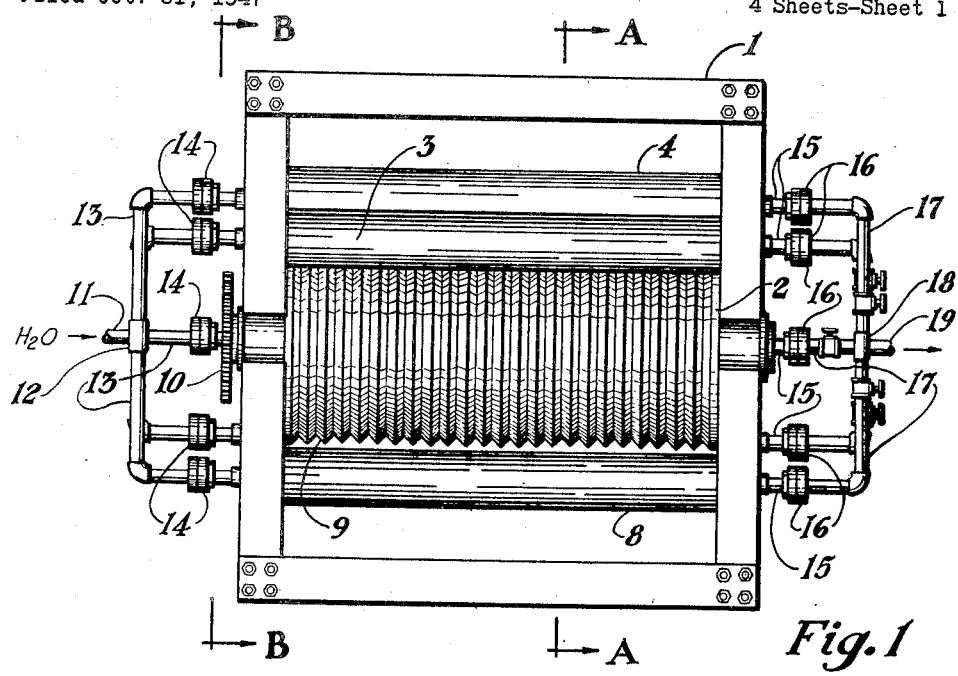

Inventor
Kenneth E. Stober
By
Griswold & Burdick
ATTORNEYS

Jan. 15, 1952  K. E. STOBER  2,582,294
CONTINUOUS METHOD FOR COOLING AND SHAPING THERMOPLASTICS
Filed Oct. 31, 1947  4 Sheets-Sheet 3

Inventor
Kenneth E. Stober

By

Griswold & Burdick
ATTORNEYS

Patented Jan. 15, 1952

2,582,294

UNITED STATES PATENT OFFICE 2,582,294

CONTINUOUS METHOD FOR COOLING AND SHAPING THERMOPLASTICS

Kenneth E. Stober, Midland, Mich., assignor to The Dow Chemical Company, Midland, Mich., a corporation of Delaware Application October 31, 1947, Serial No. 783,252

7 Claims. (Cl. 18—55)

This invention concerns a method for kneading, shaping, and cooling heat-plastified organic resins in a continuous manner.

At one or more stages in the manufacture and processing of resinous thermoplastic organic materials, e. g. polystryrene or polymerized methyl methacrylate, it is usual practice to bring them to a heat-plastified condition in which they are readily shaped under an applied pressure and may be molten. Such heating is of course done during, or immediately before, molding the resins. Masses of the resins are also often brought to a heat-plastifying temperature during preparation of the same by polymerization, and during milling of the same on heated compounding rolls to remove volatile ingredients by vaporization or to incorporate therewith other substances such as fillers, dyes, pigments, stabilizers, etc.

The thermoplastic resins are poor conductors of heat and, when brought to a plastifying temperature, cool very slowly on standing. Heated masses of the resins are particularly slow in cooling. When in a heat-plastified condition, the resins tend to accumulate and adsorb particles of dust from the air with resultant decrease in their clarity. Also, the thermoplastic resins are frequently discolored or otherwise impaired upon prolonged contact with air while in a heat-plastified condition. For these reasons it is important that a thermoplastic resin, after being heated to a plastifying temperature and contacted with the air of an open room, be cooled as quickly as possible to a temperature in the vicinity of, or below, the heat distortion temperature of the resin. A way of determining heat distortion temperatures is described in A. S. T. M. D-48-33. After the surface of the resin is cooled to, or below, the heat distortion temperature, any dust particles that accumulate are readily brushed therefrom. However, dust particles which accumulate while the resin is in heat-plastified condition tend to become incorporated in the resin.

While in a heat-plastified condition, it is also desirable that a thermoplastic resin be brought into a form suitable for use or for marketing, e. g. into the form of rods, bars, or molding granules, etc., since otherwise extra operations for forming the final products are required.

I have found that a heat-plastified thermoplastic resin may be kneaded, shaped and cooled in a continuous manner by feeding the heat-plastified, or molten, resin to a set of rolls in the manner and under the conditions hereinafter described. The resin is subjected to the several operations just mentioned during passage between a set of complementary rolls and issues as a finished elongated article having fixed cross-sectional dimensions. The method permits convenient manufacture of rods, bars, corrugated sheets, or decorative molding strips, etc. such as have heretofore been obtainable, often with difficulty, by extrusion or casting operations. It also permits the production of decorative moldings of the resin having a tightly adhering layer of a flexible non-resinous material, e. g. of cloth, paper, or wood veneer, etc., on a face thereof.

I have further observed that the kneading which takes place is advantageous in that it causes distribution of the resin over the face of a roll; repeatedly brings uncooled portions of the resin into close proximity with cooling surfaces of the rolls and thereby facilitates rapid cooling of the resin; and in that it causes distribution throughout the resin of any addition agents such as dyes, pigments, plasticizers, or fillers, etc., which may be added to the heat-plastified resin prior to feed of the latter to the rolls.

Any of the various elongated articles mentioned above may, by the method of the invention, be produced in continuous manner and in lengths as great as may be desired, e. g. in lengths of from 10 to 100 feet or more. The method is particularly adapted to the production of elongated articles having substantially uniform cross-sectional dimensions throughout their length, but when desired it may also be applied in making an elongated article having predetermined variations in the cross-sectional dimensions, e. g. cavities or protuberances, at fixed intervals throughout its length. The cross-sectional dimensions of the product are dependent upon the contour of the outer surfaces of the rolls used in forming the same and also upon the spacing between the complementary rolls.

I have further found that elongated articles, e. g. corrugated sheets, thus produced from a thermoplastic resin may be fed directly to a machine for cutting or breaking the sheet into granules of a desired size and that in this way resinous molding granules nearly free of undesirably fine particles may be produced in a continuous manner.

It will be evident from the foregoing that the method is dependent upon employment of a machine which is provided with a set of rolls that function to work and shape the resin, to cool it so that it will retain its shape, and to deliver the resultant shaped material from the rolls as it is formed. Machines somewhat similar in design and construction to that employed for the purpose of the invention have heretofore been used for other purposes, e. g. the vulcanization of rubber. However, the modes of operation and the functions of such previously known machines are different from those involved in this invention.

The accompanying drawing shows a machine suitable for use in producing elongated articles by the method of the invention and also cross sections of certain of the elongated articles which may be produced. It further illustrates, schematically, an arrangement of apparatus for the production of resin molding granules by the method of the invention.

In the drawing:

Fig. 1 is a plan view of the cooling and shaping machine employed in practice of the invention.

Fig. 2 is a view in the direction of the arrow of the section of the machine indicated as section A—A in Fig. 1.

Figure 5:
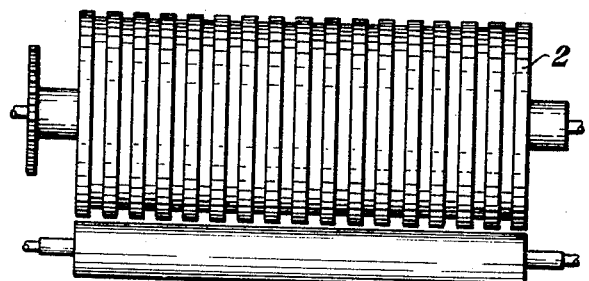
Fig. 5 is a plan view of a pair of the rolls of the machine such as may be used in producing slats, laths, bars, or beams of the polymer.
Figure 8:

Fig. 8 is an end view of the sheet of polymer which is produced when the machine is equipped with rolls such as those shown in Fig. 5. As will be seen, this sheet comprises a series of parallel bars of the polymer which are joined by thinner polymer sections. The thinner sections joining the bars are readily cut from the latter to obtain the individual bars in finished form.

Figure 6:
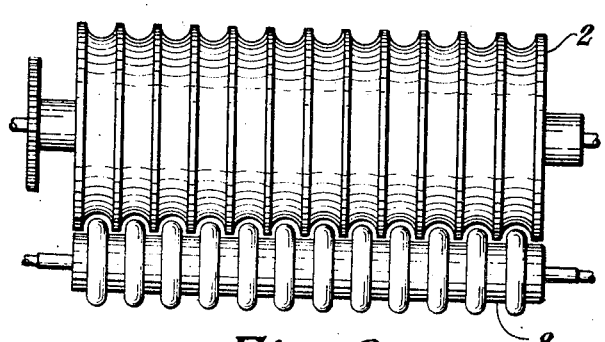
Fig. 6 is a plan view of another pair of rolls such as may be used in producing elongated troughs from the polymer.
Figure 9:

Fig. 9 is an end view of the sheet of polymer which is obtained when the machine is equipped with rolls such as those shown in Fig. 6. In this instance, the sheet comprises a series of parallel troughs of semi-cylindrical cross section which troughs are joined by thin, flat sections of the polymer. The joining flat sections may be cut away to obtain the individual troughs. If desired, pairs of the latter may be cemented or welded together to obtain the polymer in the form of tubing.

Figure 10:
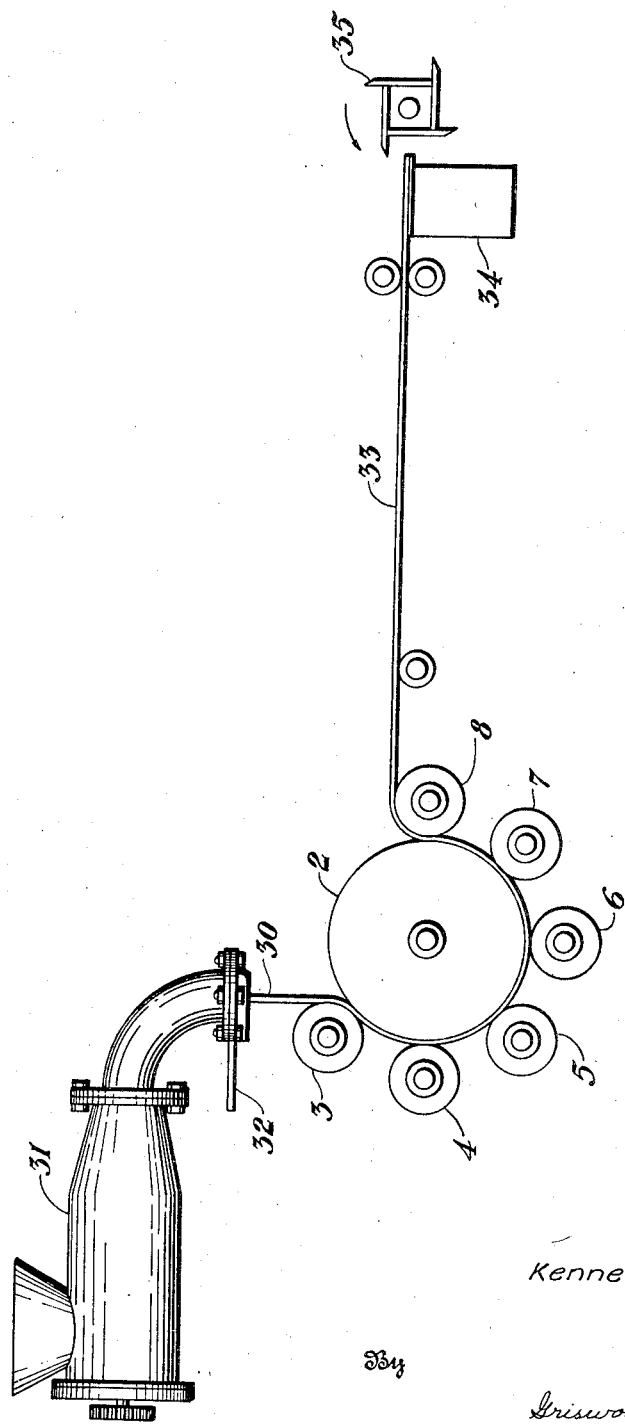

Fig. 10 is a diagrammatic sketch illustrating how the machine may be employed, in conjunction with other devices for the direct production of molding granules from a heat-plastified resin.

Figure 11:
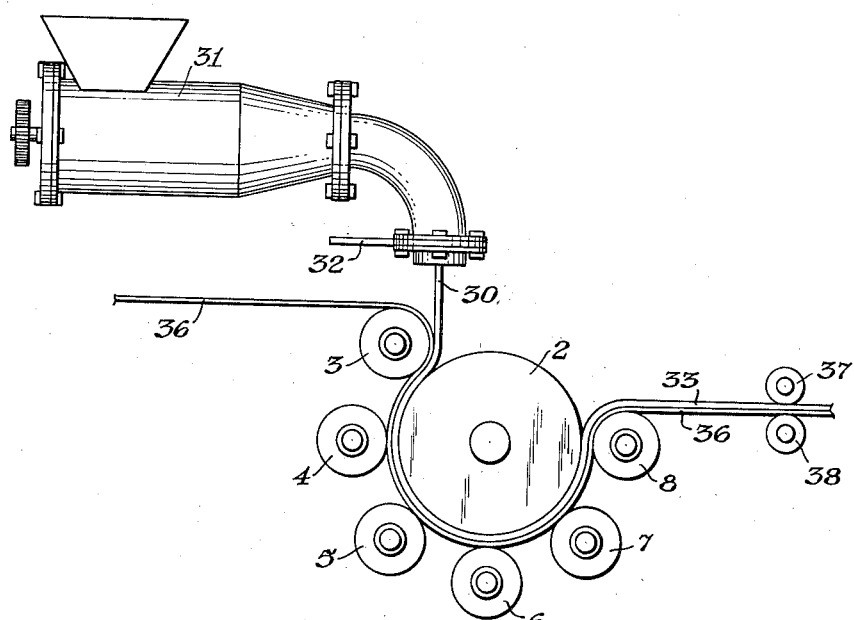

Fig. 11 is a diagrammatic sketch illustrating employment of the machine to produce a laminar body consisting of a resinous molding 33 having a layer 36 of a flexible non-resinous solid, e. g. cloth, adhering to one extended surface thereof.

As will be apparent from the drawing, the cooling and shaping machine consists essentially of a principal roll, e. g. of from 2 to 6 feet or more in diameter, which roll is provided with a series of annular grooves in its surface and is surrounded by a planetary arrangement of adjacent smaller parallel rolls. Three or more, e. g. from 3 to 12, planetary rolls are employed. The planetary rolls are usually of from 3 inches to one foot diameter, but they may be somewhat smaller or larger. The principal roll and at least the first of the planetary rolls with which the heat-plastified polymer is contacted are provided with inlets and outlets for the circulation of a cooling fluid within the same. Preferably all of the rolls are provided with means for internal cooling.

It should be mentioned that the annular grooves on the principal roll of the machine serve not only as means for shaping the resinous articles being produced, but that they extend the cooling surface of the roll and permit more rapid and efficient cooling of a resin. The presence of such grooves or channels in the roll increases markedly the productive capacity of the machine.

In Fig. 1 of the drawing the numeral 1 designates the framework of the machine within which are shown a large, or principal, roll 2 and the planetary rolls 3, 4, and 8. Axles of another planetary roll are shown projecting beyond the framework 1. The principal roll 2 is provided with a series of annular channels or grooves 9 which serve both to increase the cooling surface of the roll and as means for shaping a resin during passage between the rolls. It is also provided at one end with a sprocket, or other driving means, 10. The adjacent annular rolls, e. g. 3, 4, and 8, may be geared to the principal roll 2, or they may be employed without driving means, e. g. as idling rolls. An inlet 11 for water or other cooling fluid leads to a distributor 12 which is provided with lines 13 leading to the respective joints 14 which are, in turn, provided with lines capable of being rotated and leading to bores in the axles of the rolls of the machine. Such joints 14, provided with rotating members are known. Each roll of the machine is, of course, hollow so that the cooling fluid may flow therethrough. The lines 15 leading from the opposing ends of the rolls connect with the joints 16 which are, in turn, connected by the valve lines 17 to another distributor 18 having an outlet 19.

Fig. 2 is a cross-sectional end view of the machine at the section marked A—A in Fig. 1. It shows in cross section the hollow principal roll 2 and the adjacent hollow planetary rolls 3, 4, 5, 6, 7, and 8.

Figure 3:
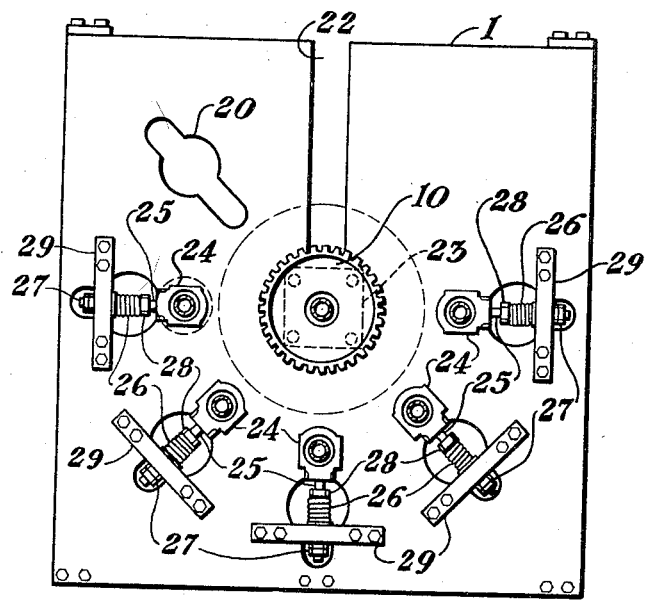
Fig. 3 is a view in the direction of the arrow of the section of the machine indicated as section B—B in Fig. 1.

Fig. 3 is an end view of the machine as seen at the section B—B in Fig. 1. For sake of clarity, one of a series of apertures 20 in framework 1, within which the bearing boxes 24 for the planetary rolls are fitted, is shown without the bearing box or roll in place. Also, in order to indicate the relative positions of the rolls, the periphery of the principal roll 2 and of one of the planetary rolls, where concealed by the framework 1, are indicated by dotted lines. As indicated, the framework 1 is provided with a slot 22 through which the axle of the principal roll 2 may be lowered in mounting said roll. A bearing box 23 which supports an end of the roll 2 and which is bolted to the framework 1 is shown by dotted lines. A bolt 25 and compression spring 26 hold each of the bearing boxes 24, for the planetary rolls, in place within the framework 1, so as to prevent appreciable arc-wise movement of the axis of a planetary roll about the axis of the principal roll, while at the same time permitting limited movement of the bearing box away from the axis of the principal roll, which movement is resisted by spring 26. The nut 27 may be turned to adjust the spacing of a planetary roll, supported by a bearing box 24, from the principal roll 2. Nut 28 may be turned to adjust the compressive force exerted by the spring 26. In place of spring 26 and bolt 25, other usual compressive means, e. g. a hydraulically operated cylinder having a piston connected to the bearing box 24, may be used to maintain the latter in position. The sprocket 10 which serves as a driving means for the principal roll is shown.

Figure 4:
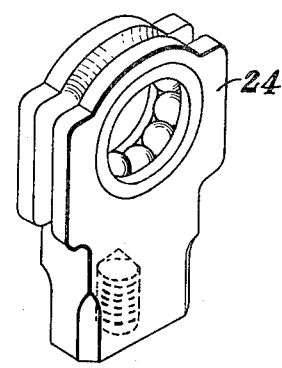
Fig. 4 is a perspective view of a bearing block.

Fig. 4 is a perspective of one of the bearing boxes 24. As will be seen, the bearing box is provided at the sides with slots for accommodating edges of the framework 1 adjacent to the aperture 20. The bearing box is also provided at an end with a threaded recess for the bolt 25 and the bearing itself is provided with a race of ball bearings. Other usual bearings and bearing boxes may, of course, be used in place of the one shown.

Fig. 5 shows the principal roll 2 when grooved in such manner as to form a series of bars of a thermoplastic resin. One of the complementary planetary rolls, e. g. roll 8, is shown in conjunction with roll 2.

Fig. 6 shows the principal roll 2 when provided with semicircular grooves. The same figure shows one of the planetary rolls 3 when provided at its surface with a series of annular rings of semicircular cross section which rings, or risers, are spaced so as to match the grooves of the roll 2.

Figure 7:
Fig. 7 is an end view of a section of polymer sheet, corrugated on one of its faces, such as is produced when the outer surface of the larger roll of the machine is grooved as indicated in Fig. 1.

As hereinbefore mentioned, the molded sheet of material produced by the machine has the appearance shown in Fig. 7 when using a principal roll 2 which is grooved as indicated in Fig. 1 of the drawing; it has the appearance shown in Fig. 8 when the principal roll 2 is grooved as indicated in Fig. 5; and it has the appearance shown in Fig. 9 when the principal roll 2 is grooved, and the planetary rolls, e. g. roll 8, are provided with annular risers, as shown in Fig. 6 of the drawing. It may be mentioned that the side walls to each groove in the surface of the roll 2, as shown in Fig. 5, may advantageously be tapered so that the groove is at least slightly narrower at the bottom than at the outer surface of the roll. Such tapering facilitates removal of the molded polymer from the roll.

Fig. 10 shows, in diagrammatic manner, a ribbon 30 of a heat-plastified resin being extruded from an extrusion device 31 which device is provided with a gate 32 for adjusting the orifice size when desired. The ribbon 30 is shown as passing between the principal roll 2 and the adjacent planetary rolls 3—8. The latter serve to cool and shape the ribbon into the sheet 33 which preferably has the appearance indicated in Fig. 7 of the drawing. Fig. 10 indicates movement of the sheet 33 to a device which comprises a cutting block 34 and a rotating cutter 35. The latter serves to cut the sheet into molding granules of a desired size. The size of the granules may, of course, be altered either by changing the rate of travel of the sheet 33 or the rate of rotation of the cutter 35. Thus, Fig. 10 illustrates the direct production of a molding powder from a body of a heat-plastified resin.

Fig. 11 shows a ribbon, 30, of a heat-plastified resin being extruded from the extrusion device 31 into contact with a sheet, 36, of a flexible non-resinous solid, e. g. cloth, which is being fed over the peripheral surface of roll 3. The resin, and the sheet 36 in contact therewith, pass between the principal roll 2, and the planetary rolls 3—8, which rolls serve to cool and shape the resin and at the same time press it against sheet 36 with resultant formation of a laminar body consisting of a resinous molding 33 having the sheet 36 adhering to an extended surface thereof. The laminar body is passed between rolls 37 and 38, which may be power driven to aid in forwarding the body.

The machine is assembled by lengthwise insertion of the planetary rolls 3—8 into the corresponding apertures 20 in framework 1 and by lowering the roll 2 within the framework so that its axle passes downward in the slot 22. The bearing box 23 on the axle of roll 2 is bolted to the framework 1. The bearing boxes 24 are fitted onto the axles of the planetary rolls 3—8 and are slid into position within the apertures 20 in framework 1. Bolts 25, which are provided with the spring 26 and nuts 27 and 28, are attached to the bearing blocks, after which the bars 29, supporting one end of the spring and holding the assemblage in place, are bolted to the framework 1. The spacing of the planetary rolls 3—8 from the principal roll 2 and the compression on the springs 26 are adjusted by means of the nuts 27 and 28. After assembling the rolls as just described the pipe lines 15 are connected with the axles thereof.

The method and the machine are adapted to the production of elongated articles, e. g. plastic moldings, having at all points a minimum wall thickness of 0.5 inch or less, preferably between 0.005 and 0.25 inch. However, the method is not suitable for the production of articles of thickness appreciably greater than 0.5 inch, since it is difficult to cool such a thick layer of heat-plastified resin during passage through the cooling and shaping rolls sufficiently to retain its shape without at the same time hardening outer surfaces of the shaped article so that they tend to crack during removal from the rolls. The distance between complementary cooling and shaping surfaces of the rolls used in forming the product should not exceed the desired wall-thickness of the product. For instance, in Fig. 5 of the drawing, the spacing between roll 8 and the adjacent points on the outer peripheral surfaces of roll 2 should not exceed 0.5 inch. If a groove in the surface of roll 2 has an average width greater than 0.5 inch, the minimum distance between the bottom of the groove and the surface of roll 8 should not exceed 0.5 inch. If such groove in roll 2 has a depth greater than 0.5 inch, it should have an average width of less than 0.5 inch.

The planetary rolls are usually all spaced approximately the same distance from the principal roll, which distance corresponds closely to the desired thickness of the resinous article to be produced. However, the intermediate planetary rolls, e. g. rolls 4—7 in Fig. 2, may be spaced slightly further from the principal roll 2 than are the first and last of said planetary rolls, i. e. rolls 3 and 8 in Fig. 2.

In producing a polystyrene molding, using the machine as illustrated by Figs. 1–4, a stream of heat-plastified or molten polystyrene is fed over roll 3 and into the space between said roll and the principal roll 2 while rotating the latter to forward the material to the planetary roll 4. A cooling fluid, usually water, is passed through the principal roll 2 and one or more of the planetary rolls 3—8 during operation of the machine. During passage between rolls 2 and 3 the polymer is worked and spread as a layer of substantially uniform thickness over peripheral surfaces of roll 2. This layer, which tends to shrink and become somewhat thicker when still in a heat-plastified condition upon leaving roll 3, is successively fed between roll 2 and the other planetary rolls 4—8. The latter serve to hold the layer tightly against the surface of roll 2 and to press it again to the desired thickness. They also aid in cooling the layer when said planetary rolls are internally cooled. The rate of flow of cooling fluid through the rolls is controlled so as to cool the polymer to approximately its heat distortion temperature when at the point of leaving the rolls. Actually, outer surfaces of the product leaving the rolls are preferably at, or slightly below the heat distortion temperature of the resin and inner portions of the product are preferably slightly warmer than the heat distortion temperature. This extent of cooling during production of the shaped article prevents appreciable shrinkage or other distortion of the cross section of the latter after leaving the rolls, but permits bending, flexing, or shaping of the article as a whole during delivery from the rolls.

In producing molding granules as illustrated in Fig. 10, a ribbon of a heat-plastified polymer, e. g. polystyrene, is extruded from the extruder 31 and is fed in continuous manner between the grooved roll 2 and the adjacent planetary rolls 3—8, which rolls are operated as described above to produce a resin sheet, preferably of the form shown in Fig. 7. The sheet travels from the cooling and shaping rolls to the cutting device where it is cut, preferably while warm, e. g. at a temperature of between 50° and 80° C., into molding granules. By cutting the sheet while warm, shattering with resultant formation of undesirably fine particles is to a large extent avoided. Granules of from 1/16 to 1/4 inch thickness or diameter are usually preferred for molding purposes. The granules are obtained in a form suitable for packaging and marketing.

The process as just described may, of course, be modified. For instance, instead of delivering the heat-plastified resin from an extrusion device to the cooling and shaping rolls it may be withdrawn in heat-plastified condition from a chamber in which it is formed and be delivered directly to the rolls. If desired, a plasticizer, a coloring agent, or a finely-divided filler may be metered into admixture with the stream of heat-plastified resin being fed to the machine, in which case the mechanical working of the mixture between rolls of the machine serves to distribute the added material throughout the layer of resin and to incorporate it in the resinous product. The method may be further modified by feeding a sheet or strips of a flexible non-resinous solid, e. g. cloth, over the successive rolls 4—8 in the space between said rolls and the principal roll 2 while feeding heat-plastified polymer to the machine and operating the latter as hereinbefore described. In this instance the product is a resinous molding having a layer of the non-resinous material adhering to, or embedded in, one face thereof.

Also, the annular grooves and ridges in the surface of roll 2, or in the surfaces of said roll and the complementary planetary rolls, may have cross sections other than those hereinbefore specifically illustrated. By suitable changes in the cross sectional configuration of such grooves and ridges at the roll surfaces, a wide variety of different elongated articles such as rods, sheets corrugated on one or both of their faces, troughs, bars, ribbons, and decorative molding strips for use in the construction of refrigerators, furniture, automobiles, or homes, etc., may readily and economically be produced. In contrast with usual extrusion processes, the process just described, which involves use of the cooling and shaping machine provided by the invention, permits the ready production of elongated resinous and thermoplastic articles which are of uniform cross section throughout their length.

Any solid resinous thermoplastic organic polymer which is sufficiently stable to permit heat-plastifying of the same may be used in producing such molded articles. Examples of such thermoplastics are the cellulose esters and ethers such as cellulose acetate or ethyl cellulose; the solid polymers of vinyl chloride, vinyl acetate, methyl methacrylate, styrene, para-chlorostyrene, ortho-chlorostyrene, meta-chlorostyrene, para-methyl-styrene, meta-ethylstyrene, para-ethylstyrene; solid copolymers such as those of styrene and ethyl-vinylbenzene or of vinyl chloride and vinylidene chloride, etc. Addition agents such as fillers, dyes, pigments, plasticizers, and stabilizers may, of course, be incorporated with the thermoplastic materials prior to producing the elongated articles therefrom.

This application is a continuation-in-part of my copending application, Serial No. 549,375, filed August 14, 1944, now abandoned.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of cooling and shaping heat-plastified organic resins in a continuous manner, the steps of feeding a heat-plastified resin to the outer surface of a rotating drum having at its periphery a series of annular grooves and ridges, carrying the resin on peripheral surfaces of the drum throughout a substantial portion of the travel involved in a single revolution of the drum, during said travel repeatedly pressing the resin as a layer against the drum surface to cause the resin layer to conform to the peripheral surfaces of the drum and to bring the wall-thickness of the resin layer to a value not greater than 0.5 inch, and at the same time passing a cooling fluid through the drum to cool the resin in immediate contact therewith to approximately its heat distortion temperature while inner portions of the resin layer are at temperatures as high as the heat distortion temperature of the resin and, while at said temperature, withdrawing the resultant shaped sheet of resin (which is in the form of a web consisting of distinct strips, or rods, connected longitudinally in side by side relation to one another) from the drum before the layer of resin has been carried on the drum a distance corresponding to a complete revolution of the latter.

2. A method, as described in claim 1, wherein the resin is polystyrene and the polystyrene in immediate contact with the carrying surface is cooled during travel on the drum to a temperature of approximately 85° C.

3. A method of manufacturing moldable thermoplastic pellets in a continuous manner, which comprises feeding a heat-plastified resin to the outer surface of a rotating drum having at its periphery a series of grooves and ridges, carrying the resin on peripheral surfaces of the drum throughout a substantial portion of the travel involved in a single revolution of the drum, during said travel repeatedly pressing the resin as a layer against the drum surface to cause the resin layer to conform to the peripheral surfaces of the drum and to bring the wall-thickness of the resin layer to a value not greater than 0.5 inch, and at the same time passing a cooling fluid through the drum to cool the resin in immediate contact therewith to approximately its heat distortion temperature, withdrawing the resultant shaped sheet of resin, which is in the form of a web containing a plurality of strips or rods connected longitudinally in side by side relation, from the drum before the layer of resin has been carried on the drum a distance corresponding to a complete revolution of the latter, and, while continuing the operations just stated, transversely severing successive end portions of the web being forwarded from the drum and simultaneously separating the parts of the severed rod portions to form individual pellets.

4. A method, as described in claim 3, wherein the resin is polystyrene, and the polystyrene in immediate contact with the carrying surface is cooled, during travel on the drum, to a temperature of about 85° C.

5. A method, as described in claim 1, wherein a sheet of a flexible, non-thermoplastic solid is fed into contact with a surface of the heat-plastified resin freshly applied to the drum and is subjected, while in contact with the resin, to the operations of repeatedly pressing the resin against the drum.

6. The method of manufacturing moldable thermoplastic pellets which comprises forming from thermoplastic material a web containing a plurality of distinct slender strips or rods each of which is of uniform cross section longitudinally thereof, said rods extending longitudinally of the web and disposed in fixed side by side relation in the web laterally thereof, moving said web in the direction of its length concurrently with the formation of the web, and concurrently severing successive free transverse end portions of the web and simultaneously separating the parts of the severed strip or rod portions, respectively, to form individual pellets.

7. The method of manufacturing moldable thermoplastic pellets which comprises forming from thermoplastic a web containing a plurality of distinct slender strips or rods each of which is of uniform cross section longitudinally thereof, said rods extending longitudinally of the web and being connected to each other in adjacent side by side relation laterally of the web by intermediate comparatively weak fin-like portions of the web, and concurrently severing successive free transverse end portions of the web and simultaneously subdividing the severed portions of the web at the weak portions thereof to form a plurality of individual pellets from each of said severed portions of the web.

KENNETH E. STOBER.

REFERENCES CITED

The following references are of record in the file of this patent:

UNITED STATES PATENTS

| Number | Name | Date |
|---|---|---|
| 1,415,929 | Grosvenor | May 16, 1922 |
| 1,497,112 | Matthew | June 10, 1924 |
| 1,942,764 | Miller | Jan. 9, 1934 |
| 2,309,729 | Gordon | Feb. 2, 1943 |

FOREIGN PATENTS

| Number | Country | Date |
|---|---|---|
| 2,939 | Great Britain | 1903 |